(12) United States Patent
Tran

(10) Patent No.: US 7,464,479 B2
(45) Date of Patent: Dec. 16, 2008

(54) LEVEL VIAL AND MANUFACTURING METHOD THEREFOR

(75) Inventor: Tho Tran, West Hartford, CT (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 11/435,723

(22) Filed: May 18, 2006

(65) Prior Publication Data

US 2007/0266577 A1    Nov. 22, 2007

(51) Int. Cl.
  *G01C 9/24*        (2006.01)
(52) U.S. Cl. ...................................................... 33/379
(58) Field of Classification Search ................ 33/379, 33/365, 369, 377, 389, 366, 451, 390, 398
  See application file for complete search history.

(56) References Cited

U.S. PATENT DOCUMENTS

| | | | |
|---|---|---|---|
| 356,645 A | | 1/1887 | Jasper |
| 562,679 A | * | 6/1896 | Traut et al. ..................... 33/379 |
| 807,873 A | * | 12/1905 | Sharp ............................ 33/389 |
| 937,357 A | * | 10/1909 | Bensen ........................ 33/379 |
| 1,488,419 A | | 3/1924 | Ward |
| 2,502,171 A | | 3/1950 | Pashby ........................ 33/207 |
| 2,576,202 A | | 11/1951 | Wullschleger ............... 33/211 |
| 2,611,972 A | | 9/1952 | Gubrud ........................ 33/211 |
| D168,400 S | * | 12/1952 | Harris .......................... 33/369 |
| 2,679,698 A | | 6/1954 | Roberts ........................ 33/211 |
| 2,752,693 A | | 7/1956 | Wullschleger ............... 33/211 |
| 3,009,250 A | | 11/1961 | Schock ........................ 33/89 |
| 3,180,035 A | | 4/1965 | Olexson et al. ............... 33/207 |
| 3,298,106 A | | 1/1967 | Duvall ......................... 33/185 |
| 3,311,990 A | * | 4/1967 | Wright ......................... 33/381 |
| 3,842,514 A | * | 10/1974 | Scheyer ....................... 33/379 |
| 3,871,109 A | | 3/1975 | Vaida ........................... 33/379 |
| 3,871,110 A | | 3/1975 | Gutowski et al. ............. 33/379 |

(Continued)

FOREIGN PATENT DOCUMENTS

EP     0 070 476 B1    4/1985

(Continued)

OTHER PUBLICATIONS

European Search Report issued for European Patent Application No. 07251942.4-1236, dated Sep. 19, 2007.

*Primary Examiner*—G. Bradley Bennett
(74) *Attorney, Agent, or Firm*—Pillsbury Winthrop Shaw Pittman LLP

(57) ABSTRACT

A method for manufacturing a vial for a level includes forming a blank body from molten material. The blank body includes an exterior surface and an internal bore. The exterior surface has an upper portion generally defining a portion of a cylinder, and a lower portion generally having a rectangular block shape. The internal bore has an interior surface that is substantially cylindrical so as to define a wall thickness that is substantially constant between the interior surface and the generally cylindrical upper portion of the exterior surface. The method also includes cooling the molten material that forms the blank body, and changing a shape of the formed cylindrical interior surface so that the wall thickness at a center portion of the blank body is thinner than the wall thickness at portions of the blank body located between the center portion and ends of the blank body.

7 Claims, 15 Drawing Sheets

U.S. PATENT DOCUMENTS

| | | | |
|---|---|---|---|
| 3,878,617 A * | 4/1975 | West et al. | 33/369 |
| 4,100,681 A | 7/1978 | Hollander | 33/389 |
| 4,347,088 A | 8/1982 | Jacquet | 156/69 |
| 4,503,624 A | 3/1985 | Whiteford | 33/451 |
| 4,534,117 A | 8/1985 | Haefner et al. | 33/379 |
| 4,635,377 A | 1/1987 | Park | 33/451 |
| 4,660,290 A | 4/1987 | Hori et al. | 33/366 |
| 4,685,219 A | 8/1987 | Haefner et al. | 33/379 |
| 4,697,349 A | 10/1987 | Lee | 33/27.03 |
| 5,003,699 A | 4/1991 | Wright | 33/379 |
| 5,105,549 A * | 4/1992 | Johnson | 33/379 |
| 5,151,849 A | 9/1992 | Nagengast et al. | 362/61 |
| 5,157,842 A | 10/1992 | Swanda | 33/365 |
| 5,467,532 A | 11/1995 | Ames | 33/334 |
| 5,651,186 A * | 7/1997 | Lindner et al. | 33/377 |
| 5,749,152 A * | 5/1998 | Goss et al. | 33/381 |
| 5,778,544 A | 7/1998 | Pherigo | 33/335 |
| 5,887,783 A | 3/1999 | Prokopis | 229/199 |
| 6,243,957 B1 * | 6/2001 | Gruetzmacher et al. | 33/382 |
| 6,572,073 B2 | 6/2003 | Jacoff | 249/67 |
| 6,735,880 B1 | 5/2004 | Jacoff | 33/379 |
| 7,086,167 B2 * | 8/2006 | Foran | 33/379 |
| 2005/0155241 A1 | 7/2005 | Scheyer | 33/379 |
| 2005/0160610 A1 | 7/2005 | Scheyer | 33/379 |
| 2005/0229412 A1 | 10/2005 | Foran | 33/365 |
| 2006/0037204 A1 * | 2/2006 | Gruetzmacher | 33/379 |

FOREIGN PATENT DOCUMENTS

| | | | |
|---|---|---|---|
| JP | 55126809 A1 * | 10/1980 | |
| JP | 62161011 A * | 7/1987 | |

* cited by examiner

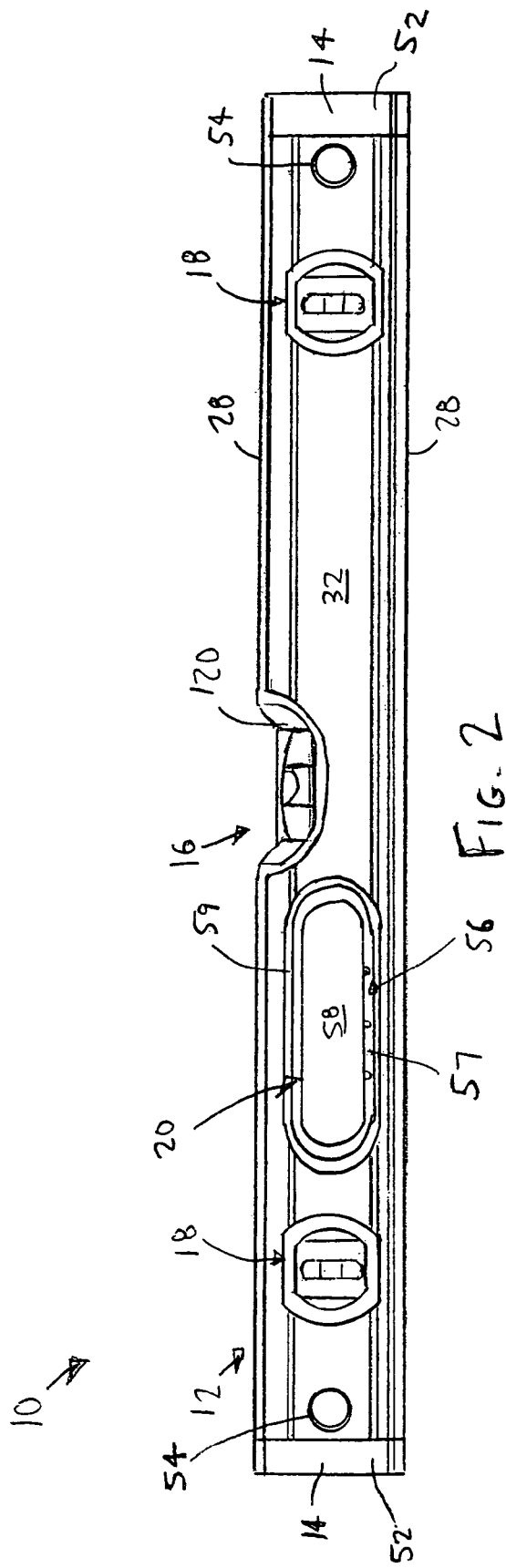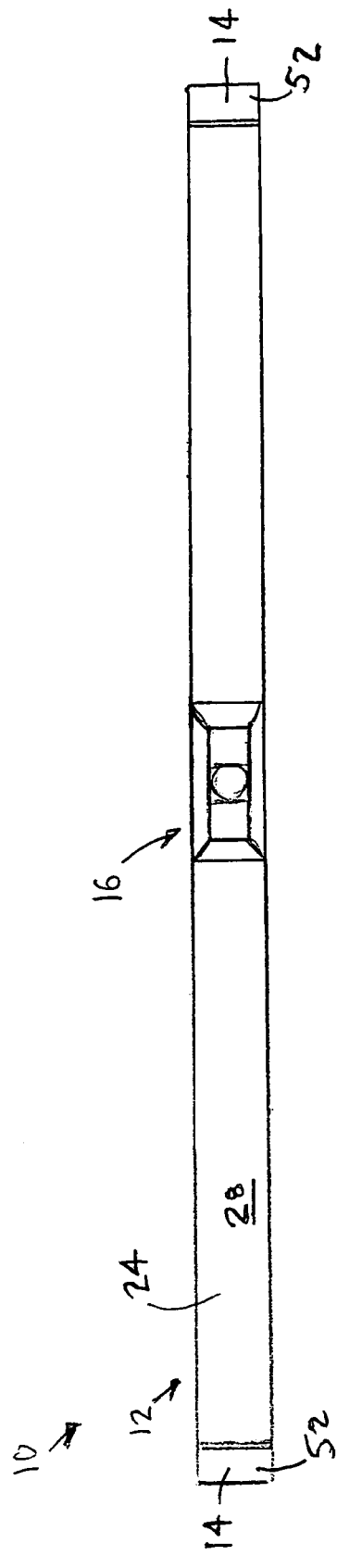

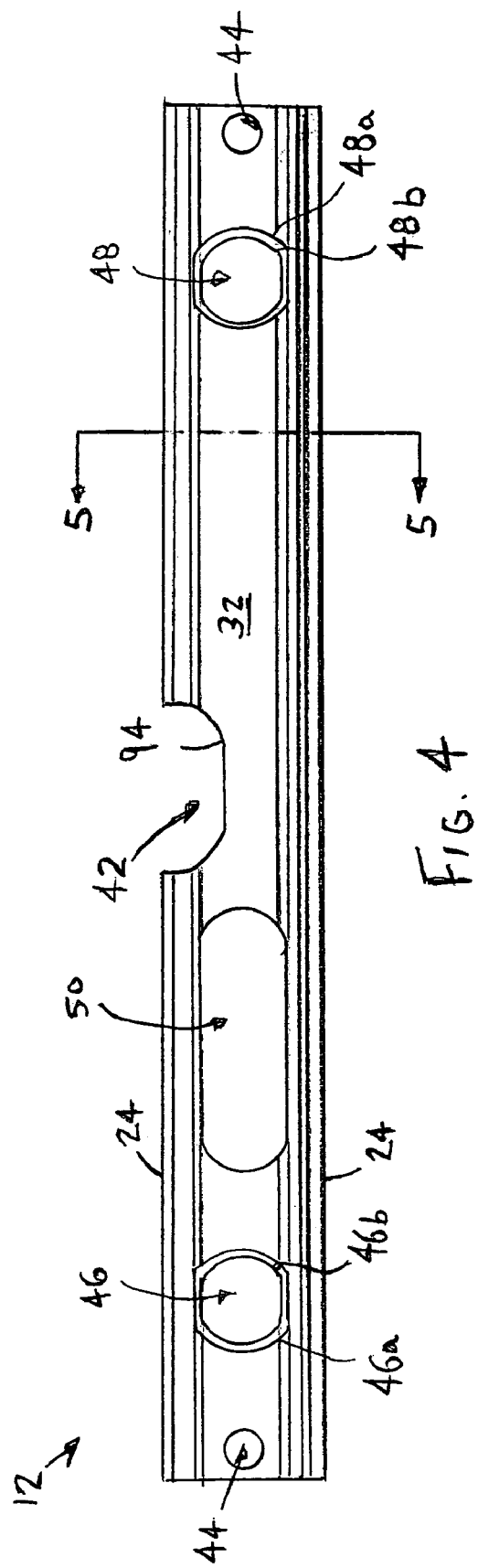

LEVEL VIAL AND MANUFACTURING METHOD THEREFOR

BACKGROUND OF THE INVENTION

1. Field of Invention

The present invention is generally related to levels that include level vials and the manufacturing of such level vials.

2. Description of Related Art

Horizontal level indicating vials that are mounted on levels have traditionally been square or rectangular. Level vials are manufactured by first extruding or injection molding a blank. Extruded blanks are cut to length, and an internal cavity is then machined with a drill or some other suitable cutting device. Blanks that are molded typically have the cavity already molded in with the use of a core pin.

Some injection molded vials have a rounded top, or viewing window, which provide a magnifying effect to the bubble contained within the cavity of the vial. Perfectly square or rectangular vials do not provide this magnification, and the corners of such vials actually obstruct the view of the bubble, thereby limiting the range of vantage points that may be used to read the vial. Conventional vials with rounded tops have square ends to facilitate assembly to create the level, but these square ends also obstruct the view of the bubble from certain vantage points.

For improved sensitivity of the level, the cavity within a conventional vial is shaped as a barrel rather than a cylinder. However, combining the advantages of the rounded top with the barrel-shaped cavity has led to vials with decreased accuracy. This is due to the injection molding process and the cooling of the blank. Specifically, because molding the blank with a uniform curved outer surface and a barrel shaped inner surface creates a blank with a non-uniform thickness, i.e., the wall at the longitudinal center of the blank is thinner than the wall near the end of the blank, the cooling rate of the material varies with location. The center of the blank will cool more quickly than the ends of the blank. These differences in cooling rates may have a detrimental effect on the dimensional stability of the blank, which may lead to vial inaccuracy.

It is desirable to manufacture a vial that provides magnification of the bubble from a wider range of vantage points, yet has improved accuracy over the conventional vials.

BRIEF SUMMARY OF THE INVENTION

One aspect of the present invention is to provide a magnifying horizontal level indicating vial with improved accuracy.

In an embodiment of the invention, a method for manufacturing a vial for a level is provided. The method includes forming a blank body from molten material. The blank body formed from molten material comprises an exterior surface and an internal bore. The exterior surface has an upper portion generally defining a portion of a cylinder, and a lower portion generally having a rectangular block shape. The internal bore has an interior surface that is substantially cylindrical so as to define a wall thickness that is substantially constant between the interior surface and the generally cylindrical upper portion of the exterior surface. The method also includes cooling the molten material that forms the blank body, changing a shape of the formed cylindrical interior surface so that the wall thickness at a center portion of the blank body is thinner than the wall thickness at portions of the blank body located between the center portion and ends of the blank body, filling the blank body with a liquid in an amount that creates a bubble within the blank body, and sealing the blank body with the liquid contained inside.

In an embodiment of the invention, a vial for a level is provided. The vial includes a body that is defined by a generally cylindrically shaped upper exterior surface portion extending from a first end surface to a second end surface, and a generally rectangular, block shaped lower exterior surface portion. The vial also includes a sealed barrel-shaped cavity within the body, and a liquid contained within the cavity. The liquid is at an amount that creates a bubble within the cavity.

In an embodiment, a level is provided. The level includes a frame, a vial holder attached to the frame, and a vial supported by the vial holder. The vial includes a body that is defined by a generally cylindrically shaped upper exterior surface portion extending from a first end surface to a second end surface, and a generally rectangular, block shaped lower exterior surface portion. The vial also includes a sealed barrel-shaped cavity within the body, and a liquid contained within the cavity. The liquid is at an amount that creates a bubble within the cavity. The vial is supported by the vial holder via a vial mount. The mount is configured to engage the base, the first end surface, and the second end surface of the vial.

In an embodiment, a vial for a level is provided. The vial includes a body having a first longitudinal end and a second longitudinal end. The body has a generally rectangular block shaped lower exterior surface, having an upper surface that is curved as the surface extends laterally from one side of vial to the opposite side of the vial. The curved upper surface is formed along an entire length of the vial body. The vial also includes a sealed barrel-shaped cavity within the body, and a liquid contained within the cavity. The liquid is in an amount that creates a bubble in the cavity. The bubble is magnified by the curved upper surface.

Other objects, features, and advantages of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 2 is a side view of the level of FIG. 1;

FIG. 3 is a top view of the level of FIG. 1;

FIG. 4 is a side view of a frame of the level of FIG. 2;

DETAILED DESCRIPTION OF THE INVENTION

Figure 1:
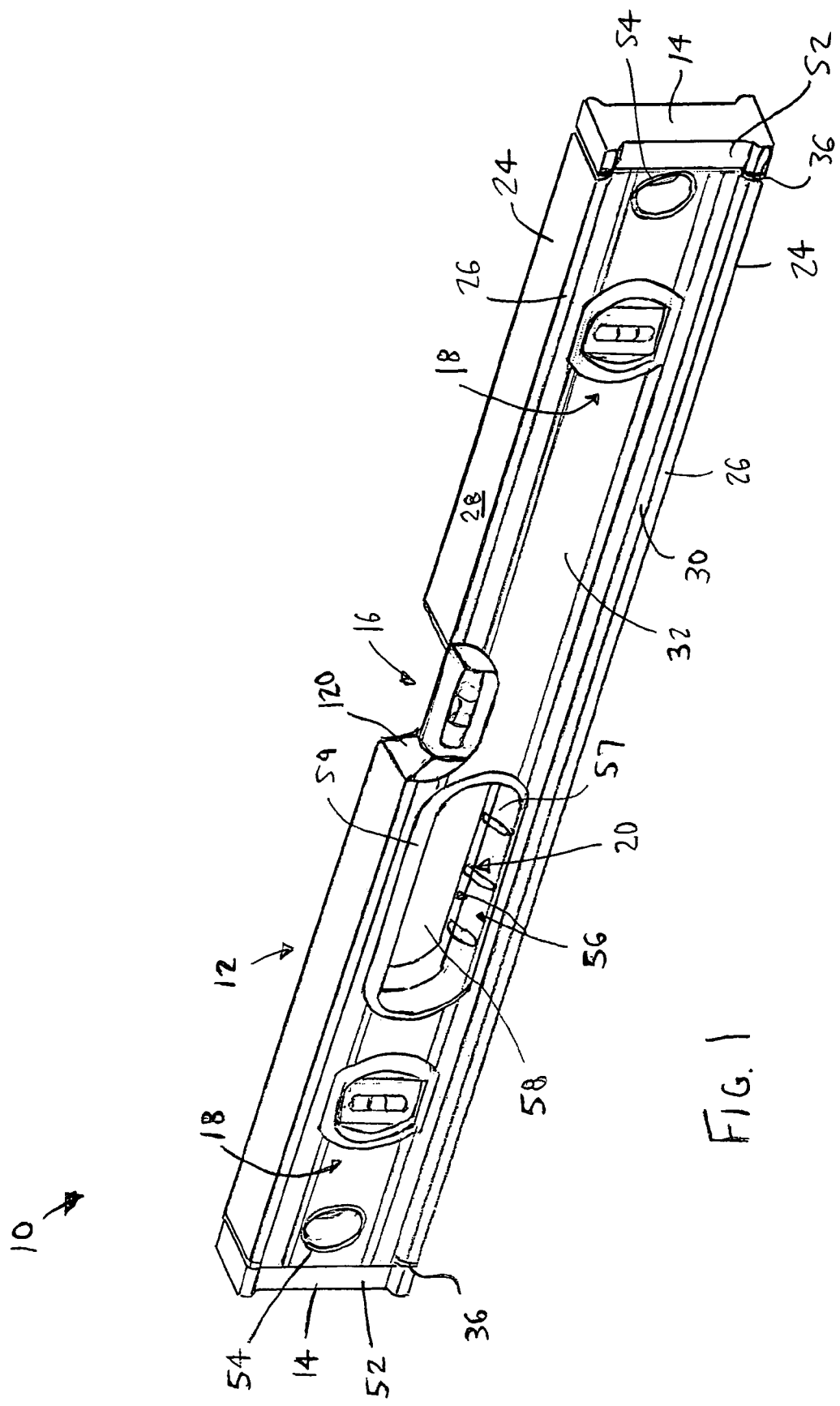
FIG. 1 is a perspective view of a fully assembled level according to an embodiment of the invention.

Referring now more particularly to the drawings, FIG. 1 shows an embodiment of a level, generally indicated at 10, embodying the principles of the present invention. The level 10 comprises a frame, generally indicated at 12, having an extruded thin wall structure with an opening of I-shaped configuration from end to end thereof. A pair of end members, generally indicated at 14, is mounted in the open ends of the frame 12. Each end member 14 is constructed and arranged to cooperate with the configuration of the frame 12 so as to be fixedly secured in closing relation with respect to the associated end of the frame 12.

The level 10 further comprises a horizontal level indicating vial assembly, generally indicated at 16, a pair of vertical level indicating vial assemblies, generally indicated at 18, and a hand hold assembly, generally indicated at 20. The horizontal level indicating vial assembly 16, the pair of vertical level indicating vial assemblies 18, and the hand hold assembly 20 are constructed and arranged to cooperate with the configuration of the frame 12 so as to be fixedly secured within the frame 12, as will be discussed in further detail below.

Figure 5:
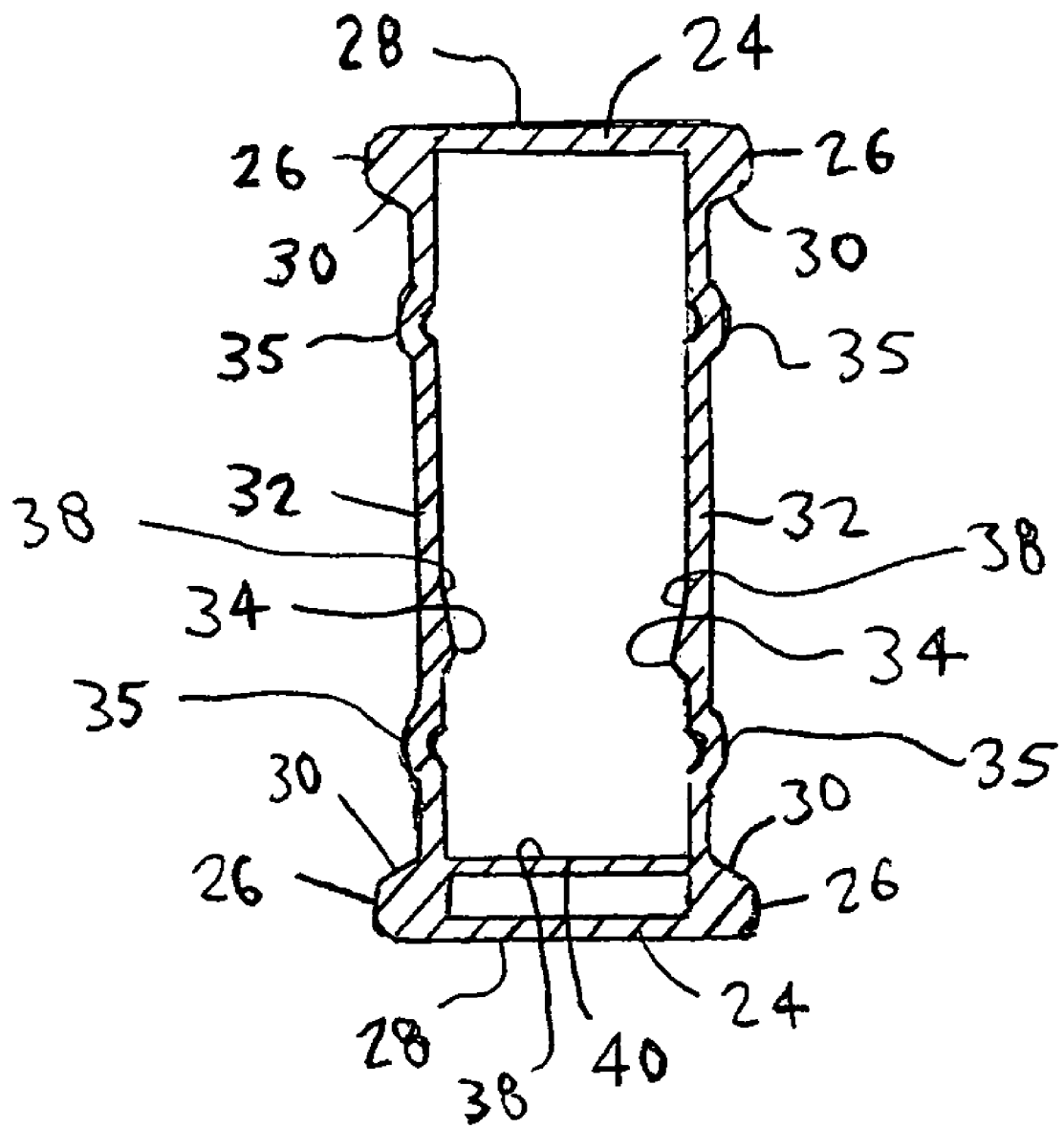
FIG. 5 is a cross-sectional view of the frame taken along line 5-5 in FIG. 4.

As best shown in FIG. 5, the frame 12 includes a pair of elongated operative walls 24. Each operative wall 24 has a pair of transversely spaced inwardly turned flanges 26 defining the width thereof and an exterior operative surface 28 on each of the operative walls 24 extending between the flanges 26 thereof. The operative surfaces 28 are preferably planar arid parallel and are configured to come into contact with a reference surface, but may take other configurations to provide enhanced resistance to twisting loads about the longitudinal axis of the frame 12. A pair of angular walls 30 extends from each pair of spaced flanges 26 in converging relation with one another to provide structural continuity for the frame 12.

A pair of central side walls 32 are spaced apart in the direction of the width of the operative walls 24 a distance less than the width of the operative walls 24 and integrally interconnected between the pairs of angular walls 30 extending from the flanges 26. A pair of inwardly defined ribs 34 may extend inwardly from one of the central side walls 32 and toward the opposite central side wall 32. As discussed in greater detail below, the inwardly defined ribs 34 may be used to help position and attach the horizontal level indicating vial assembly 16, and the vertical level indicating vial assemblies 18 to the frame 12. The frame 12 may also include opposing pairs of outwardly defined ribs 35 that extend outwardly from the central side walls 32, as shown in FIG. 5. These outwardly defined ribs 35 may help provide strength to the frame 12 by providing enhanced resistance to twisting loads about the longitudinal axis of the frame 12. A plurality of interior surfaces 38 of the frame 12 are defined by the elongated operative walls 24, the central side walls 32, as well as an elongated reinforcing rib 40 that is parallel to the pair of elongated operative walls 24, as shown in FIG. 5. The elongated reinforcing rib 40 extends the entire length of the frame 12 and not only provides reinforcement to the frame 12, but also provides the interior surface 38 on which the horizontal level indicating vial assembly 16 may be mounted, as discussed in further detail below.

The frame 12 is preferably made from aluminum as for example, 6005 T5 aluminum. It is contemplated that the frame 12 could be made from any suitable material for securing the pair of end members 14, the horizontal level indicating assembly 16, the pairs of vertical indicating assemblies 18, and the hand hold assembly 20 therein.

As shown in FIG. 4, one of the operative walls 24 of the frame 12 has a central opening 42 therein. The opening 42 extends into the pair of central side walls 32 so as to define a space for the horizontal level indicating vial assembly 16, as will be discussed in further detail below. The pair of central side walls 32 further includes a plurality of adjacent coextensive generally aligned openings 46, 48, 50 therethrough. There are two pairs of aligned openings 46, 48 that are each configured to receive one of the vertical level assemblies 18.

The aligned openings 46 include a larger opening 46a in one of the central side walls 32, and a smaller opening 46b in the opposite central side wall 32. Similarly, the aligned openings 48 include a larger opening 48a in one of the central side walls 32, and a smaller opening 48b in the opposite central side wall 32. The purpose for the different sized openings will be discussed in greater detail below.

The openings 50 are longitudinally elongated and may have a plurality of recesses (not shown) in the periphery thereof configured to receive the hand hold assembly 20. In addition to the insert receiving openings 42, 46, 48 and 50, there are also a pair of openings 44 near each end of the frame 12. The edges 36 and the openings 44 at each end of the frame 12 cooperate with the associated end member 14 to retain it in a fixed position relative to the frame 12. The remaining portions of the operative wall 24 coextensive with the central opening 42 and the associated coextensive portions of the adjacent flanges 26 and angular walls 28 provide structural continuity for the frame 12 in the area of the openings 46, 48, and 50.

Each end member 14 is formed in an inner core of relatively hard material, which interfaces with the frame 12 and an outer layer of elastomeric material. The relatively hard material may be a commercially available material from the Taiwan Polypropylene Company and sold under the name Profax 7533. The elastomeric material may be a thermoplastic elastomer having a durometer ranging from 70-80 as for example, J Flex 3210-63A. As best shown in FIGS. 1, and 2, each end member 14 includes an end portion 52 extending outwardly of the adjacent end edge 36 of the frame 12. The elastomeric material provides a shock absorption function for the associated end of the frame 12 in the event that the level 10 is dropped on an end.

A projecting portion (not shown) extends from each end portion 52 and is received within the frame 12. Interior interference surfaces also formed by the harder core material extend inwardly from the inwardly extending end edges in slightly converging relation toward one another. The interior interference surfaces of each end member 14 are disposed adjacent the interior frame surfaces of the associated operative wall 24 throughout the width thereof. Rivets 54, or any other suitable connectors, are used to secure the end members 14 to the frame 12. Specifically, for each end member 14, one rivet 54 is passed through one of the openings 44 in one of the central side walls 32, then through the projecting portion of the end member 14, then through the other aligned opening 44 in the opposite central side wall 32. This helps to prevent the end member 14 from being separated from the frame 12, even when the level 10 is dropped on a hard surface.

FIGS. 1 and 2 illustrate the hand hold assembly 20, which includes a pair of longitudinally elongated cooperating peripheral members 56. The cooperating peripheral members 56 are formed of identical configuration. The cooperating peripheral members 56 are formed in a mold to include an inner core of relatively hard material as for example polypropylene, which interfaces with the frame 12 and an outer layer of elastomeric material, which defines a hand hold opening 58 in the position of the elongated openings 50 in the central side walls 32.

The outer layer of each peripheral member 56 forms one half of the hand hold opening 58, the dual material construction of which is essentially an elongated annular wall 57 having an outwardly extending peripheral flange portion 59 providing a surface at one end thereof configured and positioned to engage an exterior marginal surface area of the central side wall 32 surrounding the elongated openings 50 therein. The inner ends of the outer layer of the annular walls 57 abut one another at the centerline.

The hand hold assembly 20 is moved into the operative position thereof in the following manner. The cooperating peripheral members 56 are axially moved into the operative position thereof to retain the peripheral members 56 in fixed relation. The peripheral members 56 are configured to provide a snug fit with the openings 50. The surface of the outwardly extending flange portion 59 engages the outwardly facing exterior marginal surface area of the central side walls 32 surrounding the elongated openings 50. One peripheral member 56 abuts the annular wall 57 of the other peripheral member 56 to define the hand hold opening 58 in the position of the elongated openings 50 in the central side walls 32.

The peripheral members 56 may be attached to one another with adhesive, screws or any other type of fastener. In an embodiment, screws are inserted through one of the peripheral members 56 and into the other peripheral member 56, thereby securing the two peripheral members to each other, with the thin wall frame structure 12 disposed therebetween. Further details of the hand hold assembly 20 may be found in, for example, U.S. Pat. No. 6,792,686, which is incorporated herein by reference.

As shown in FIGS. 6-11, the horizontal level indicating vial assembly 16 includes a horizontal level indicating vial 60, a vial mount 62, a vial holder 64, and a plug 66.

Figure 6:
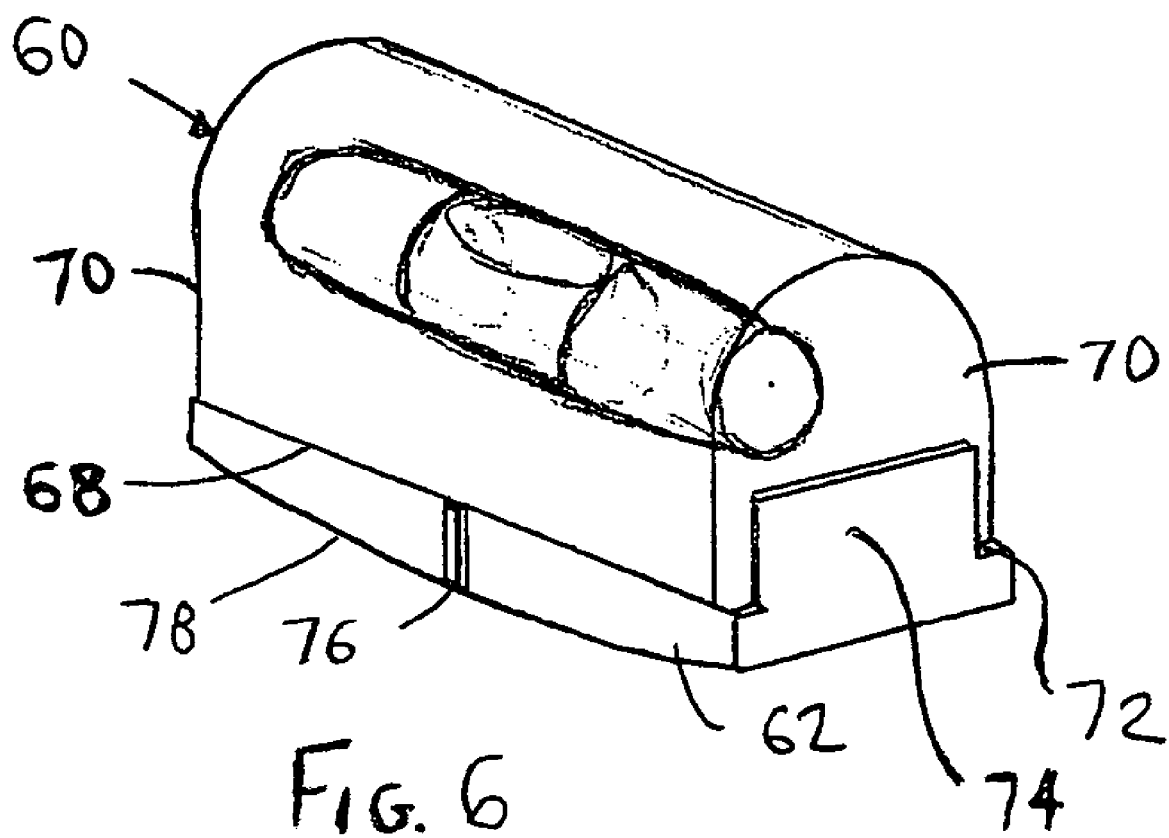
FIG. 6 is a perspective view of an embodiment of a horizontal indicating vial and mounting plate of a horizontal indicating level vial assembly.

As illustrated in FIG. 6, the vial 60 is rounded on three sides thereof to form a half-cylinder, so as to give a magnified effect when viewed from a wide range of positions. The vial 60 also includes an elongated substantially horizontal planar surface 68 and a pair of substantially parallel vertical surfaces 70 that extend from the elongated horizontal surface 68 in a substantially perpendicular manner. The vertical surfaces 70 define the ends of the vial 60. Additional details of the vial 60 and a method of manufacturing the vial 60 are provided below.

The vial mount 62 is constructed and arranged to fixedly secure the vial 60 in an operative position to the vial holder 64. As shown in FIG. 6, the vial mount 62 includes a substantially horizontal planar surface 72 that is configured to receive the horizontal planar surface 68 of the vial 60. The vial mount 62 also includes a pair of substantially vertical planar walls 74 at each end that are configured to contact the vertical surfaces 70 of the vial 60. The vial 60 may be secured to the vial mount 62 with any suitable adhesive. As illustrated, the vial mount 62 also includes a guide 76 that is preferably at the center of the vial mount 62 so as to correspond with the center of the vial 60 when the vial 60 is mounted to the vial mount 62. A bottom surface 78 of the vial mount 62 may be curved, as shown in FIG. 6, which may help facilitate the leveling of the vial 60 to its proper position upon assembly of the level 10.

Figure 8:
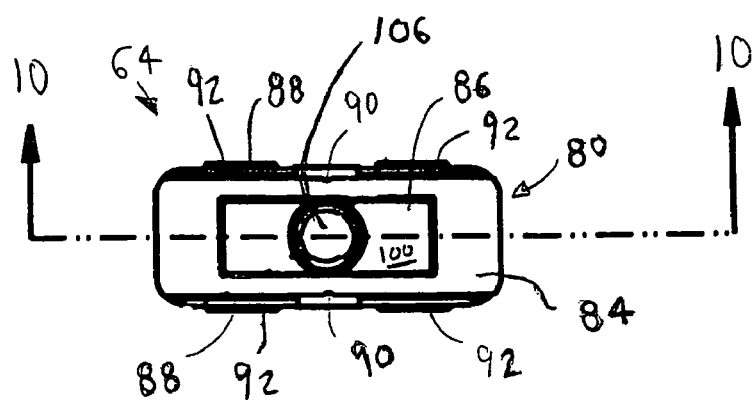
FIG. 8 is a top view of the vial holder of FIG. 7.
Figure 9:
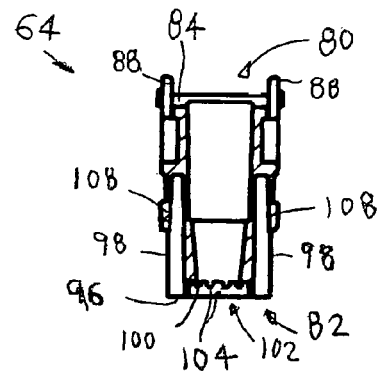
FIG. 9 is a cross-sectional view of the vial holder taken along line 9-9 in FIG. 7.
Figure 10:
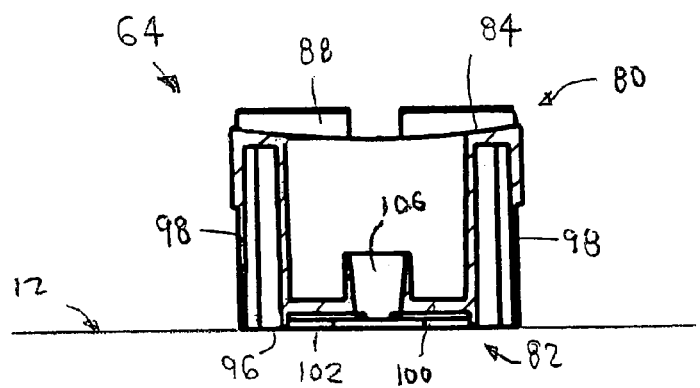
FIG. 10 is a cross-sectional view of the vial holder taken along line 10-10 in FIG. 8.

FIGS. 7-10 illustrate an embodiment of the vial holder 64. The vial holder 64 may be molded from any suitable plastic material. As shown, the vial holder 64 is substantially rectangular in shape, and includes a vial mount receiving portion 80 at a top end thereof, and a frame engaging portion 82 at a bottom end thereof. The vial mount receiving portion 80 includes a surface 84 with an opening 86. The surface 84 is configured to engage the bottom surface 78 of the vial mount 62 such that the two surfaces 78, 84 engage each other along the entire surface thereof. As shown in FIG. 10, the surface 84 may also be curved. In the embodiments where both surfaces 78, 84 are curved, the surfaces 78, 84 are preferably defined by the same arc. The vial mount receiving portion 80 also includes a pair of substantially parallel opposed walls 88 that extend upward from the surface 84. The walls 88 are spaced apart such that the vial mount 62 may be snugly fit between the walls 88. Preferably, the tops of the walls 88 extend slightly above or are coplanar with the horizontal planar surface 72 of the vial mount 62 when the vial mount 62 is positioned on the surface 84 of the vial holder 64.

Figure 7:
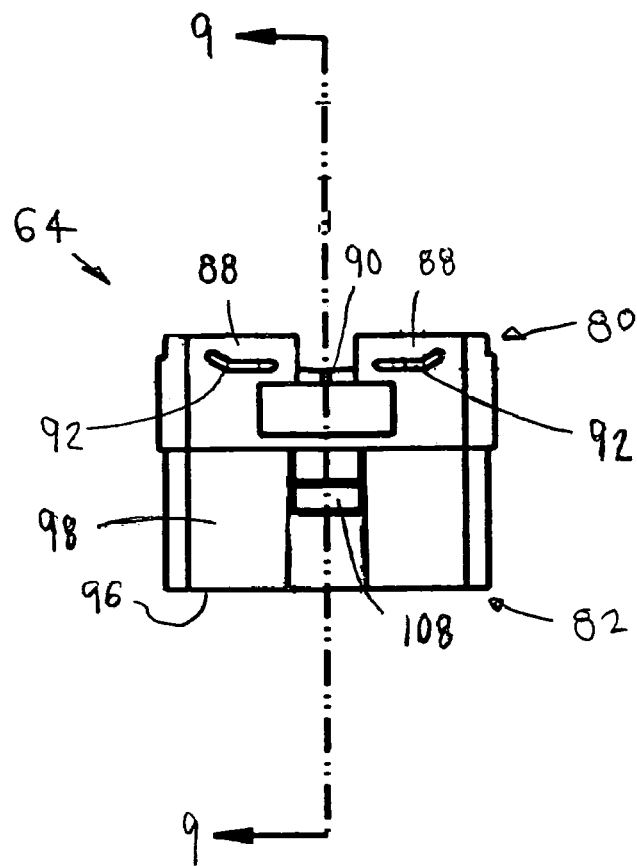
FIG. 7 is a side view of a horizontal indicating level vial holder of the horizontal indicating level vial assembly according to an embodiment of the invention.

As shown in FIGS. 7 and 8, at least one guide 90 is also provided on the vial holder 64. In the illustrated embodiment, two guides 90 are provided on opposite sides of the surface 84. The guide 90 is positioned substantially in the center of the surface 84 and is configured to align with the guide 76 on the vial mount 62 to facilitate the proper mounting and aligning of the vial 60 to the frame 12. As illustrated, the vial holder 64 also includes a plurality of locators 92 that are configured to locate the vial holder 64 relative to the frame 12 in at least two directions. The locators 92 are configured to engage the central side walls 32 of the frame 12 at the opening 42. When the vial holder 64 is inserted into the frame 12 via the opening 42, the locators 92 engage upwardly facing surfaces 94 (see FIG. 4) of the walls 32 in the opening 42 so as to locate the vial holder 64 in the vertical and horizontal (along the length of the frame) directions. The shape of the locators 92 and the opening 42 are configured to locate the vial holder 64 substantially in the center of the frame 12 along its longitudinal axis. This facilitates proper placement of the vial holder 64 in the frame 12.

The frame engaging portion 82 includes a surface 96 that is configured to engage the interior surface 38 of the frame 12 that is provided by the elongated reinforcing rib 40. Preferably, the surface 96 is defined by the ends of a plurality of vertical walls 98 that encompass the vial holder 64. This way, the actual contact area between the vial holder 64 and the frame 12 may be minimized. The frame engaging portion 82 also includes a bottom wall 100 that is spaced from the surface 96 so that when the surface 96 is in contact with the interior surface 38 of the frame 12, a small cavity 102 is formed, as shown in FIG. 10. The bottom wall 100 preferably includes a roughened surface, which may be created with a plurality of ribs 104 extending downward and into the cavity 102. The purpose of the cavity 102 and the ribs 104 will be explained in further detail below. An opening 106 is provided in the bottom wall 100 that allows access to the cavity 102 once the vial holder 64 has been inserted into the frame 12.

As shown in FIGS. 7 and 9, the frame engaging portion 82 also includes at least one tab 108 on one of the vertical walls 98 that is configured to engage one of the inwardly defined ribs 34 within the frame 12. In the illustrated embodiment, a pair of tabs 108 is provided on opposite walls 98 and is configured to engage the pair of inwardly defined ribs 34 illustrated in FIG. 5. Each tab 108 is preferably configured to have a sloped surface that compliments the sloped surface of the corresponding rib 34 that it engages. Each tab 108 is preferably flexible so that it is allowed to move toward the wall 98 from which it extends as the thickest portion of the tab 108 engages the thickest portion of the corresponding rib 34, so as to allow the tab 108 to pass by the rib 34 and then snap back to its normal position. This snap action allows engagement of each tab 108 and its corresponding rib 34 and locks the vial holder 64 to the frame 12 in the vertical direction.

Once the vial holder 64 has been locked into place in the frame 12 via the tabs 108, and located via the locators 92, an adhesive applicator may be inserted into the opening 106 so that a predetermined amount of adhesive may be inserted into the cavity 102. The adhesive may be an epoxy resin, or any other type of adhesive that is commonly used to attach plastic to metal. Preferably, the adhesive is a quick-setting adhesive. As shown in FIG. 10, the opening 106 may have sloped walls so that it may receive the applicator to facilitate the accurate positioning of the applicator, so that the adhesive may only flow into the cavity 102, rather than the interior of the vial holder 64. The design of the cavity 102 and the frame engaging portion 82 does not allow the adhesive to exit the cavity 102, which prevents an excessive amount of adhesive from being applied. The ribs 104 in the cavity add surface area for the adhesive to contact, thereby improving the adhesive bond that may be formed between the vial holder 62 and the frame 12. Once the predetermined amount of adhesive has been inserted into the cavity 102, the applicator may be removed.

Figure 11:
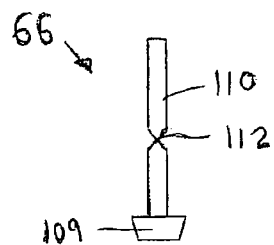
FIG. 11 is a side view of a plug of the horizontal level vial holder assembly.

To ensure that the adhesive stays within the cavity, the plug 66 or cover may be inserted into the opening. As shown in FIG. 11, one end 109 of the plug 66 may be configured to compliment the shape of the opening to provide a snug fit. Preferably, the plug 66 also contacts the adhesive, thereby attaching the plug 66 to the vial holder 64. The plug 66 includes a stem 110 with a reduced diameter portion 112 that allows the stem 110 to be broken at the reduced diameter portion 112 after the plug 66 has been securely attached to the bottom wall 100. The broken off portion of the stem may then be discarded.

After the plug 66 has been securely attached to the bottom wall 100, the vial mount 62, with the vial 60 already mounted thereon, may be attached to the vial holder 64 by aligning the guides 76, 90 and positioning the vial mount 62 so that the vial 60 is accurately positioned relative to the reference surface. That is, assuming the reference surface is exactly horizontal, the vial mount 62 is positioned so that the vial 60 gives a perfectly horizontal reading. The vial mount 62 may then be permanently attached to the vial holder 64 via a suitable adhesive. Of course, while the adhesive is still uncured, further adjustments may be made to the vial mount to ensure accuracy of the level 10. A cover 120 (shown in FIGS. 1 and 2) may be placed over the horizontal indicating vial assembly 16 to cover any openings between the assembly 16 and the frame 12 and provide a finished look.

FIGS. 1 and 2 show the pairs of vertical level indicating vial assemblies 18 in an operative position between the central side walls 32 of the frame 12. Because each of the vertical level indicating vial assemblies 18 has the same construction and operation, a description of one will suffice to provide an understanding of both.

Each vertical level indicating vial assembly 18 includes a vial holder 130, a plug 132, a vertical level indicating vial 134, and a flange 136. In general, the vial holder 130 and the flange 136 retain the vertical leveling indicating vial 134 in an operative position between the central side walls 32 of the frame 12, as will be described in further detail below.

FIGS. 12-16 illustrate an embodiment of the vial holder 130. The vial holder 130 may be molded from any suitable plastic material. As shown, the vial holder 130 includes a flange 138 that defines an opening 140. The flange 138 is configured to extend into the smaller opening 48b of the frame 12 (shown in FIG. 4) such that an outer surface 142 of the flange 138 is substantially coplanar with the outer surface of the central side wall 32 of the frame 12, and a circumferential surface 144 of the flange 138 engages an edge of the central side wall 32 of the frame 12 created by the opening 48b (see FIG. 13). In other words, the flange 138 is configured to complement the opening 48b such that substantially no gaps are created between the flange 138 and the central side wall 32 of the frame 12 when the vial holder 130 is attached to the frame 12, thereby giving the level 10 a finished look.

Figure 13:
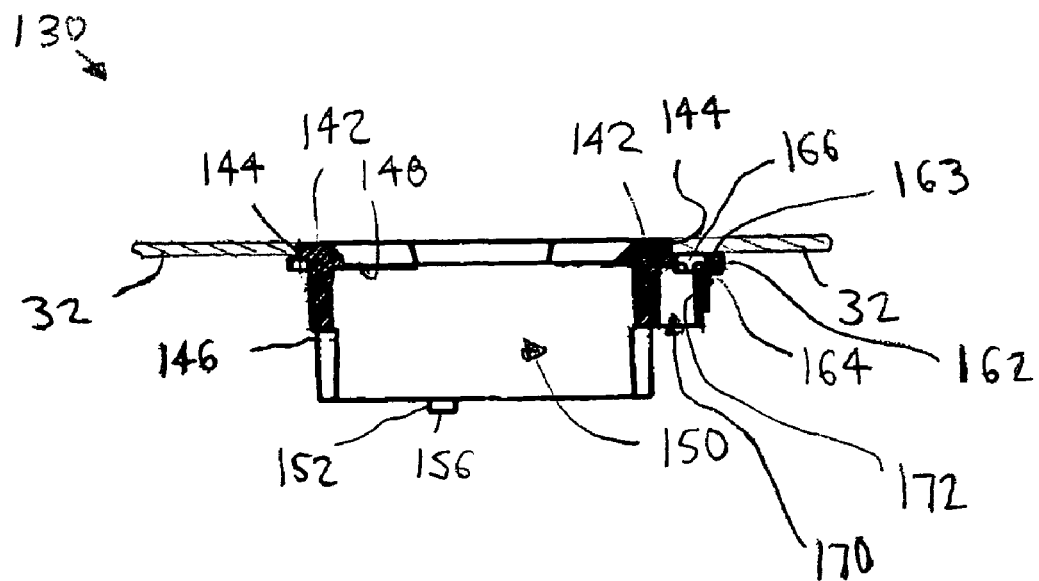
FIG. 13 is a cross-sectional view of the vial holder taken along line 13-13 in FIG. 12.
Figure 14:
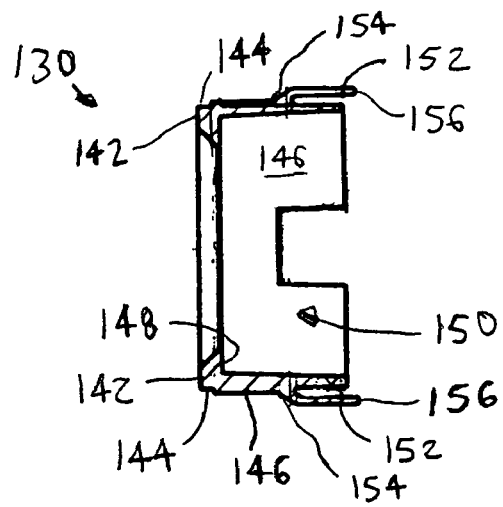
FIG. 14 is a cross-sectional view of the vial holder taken along line 14-14 in FIG. 12.
Figure 15:
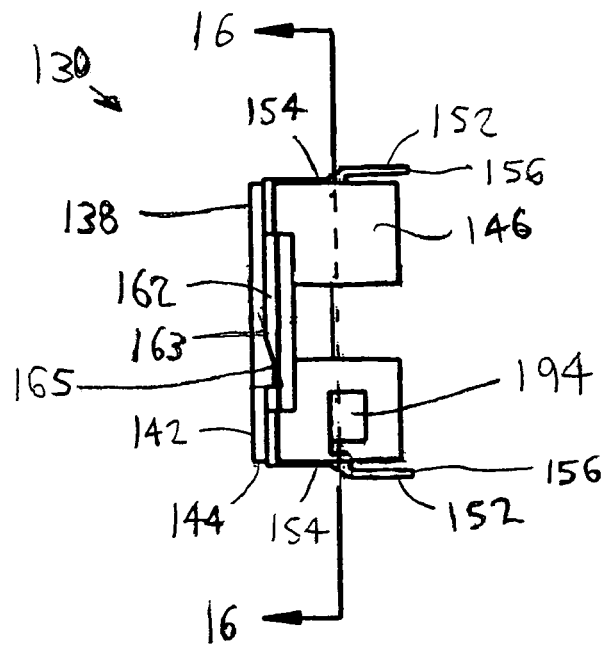
FIG. 15 is a side view of the vial holder of FIG. 12.

As shown in FIGS. 13-16, the vial holder 130 also includes a wall 146 that extends from an inner surface 148 of the flange 138 and defines a vial receiving space 150. Although the wall 146 may define the vial receiving space 150 to be any suitable shape that complements the vertical level indicating vial 134, the space 150 preferably has a substantially circular circumference. As shown in FIGS. 14 and 15, a plurality of tabs 152 extend from an outer surface 154 of the wall 146. The tabs 152 have a finger-like shape and are configured to flex relative to the wall 146 so that they may be moved toward the wall 146 when the vial holder 130 is inserted into the frame 12, as will be discussed in greater detail below. As shown in FIGS. 14 and 15, distal ends 156 of the tabs 152 extend past the wall 146 and are configured to engage the central side wall 32 of the frame 12 that includes the opening 48a. This allows the vial holder 130 to be wedged between the central side walls 32 of the frame 12 once the vial holder 130 has been inserted into the frame 12 through the larger opening 48a.

Figure 12:
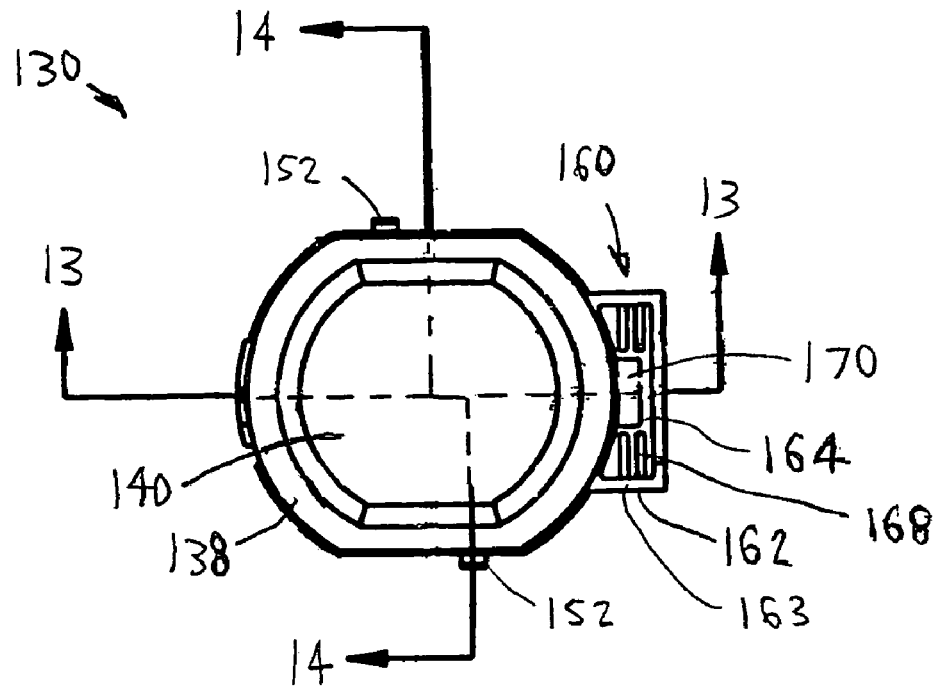
FIG. 12 is a bottom view of a vial holder of a vertical indicating level vial holder assembly according to an embodiment of the invention.
Figure 16:
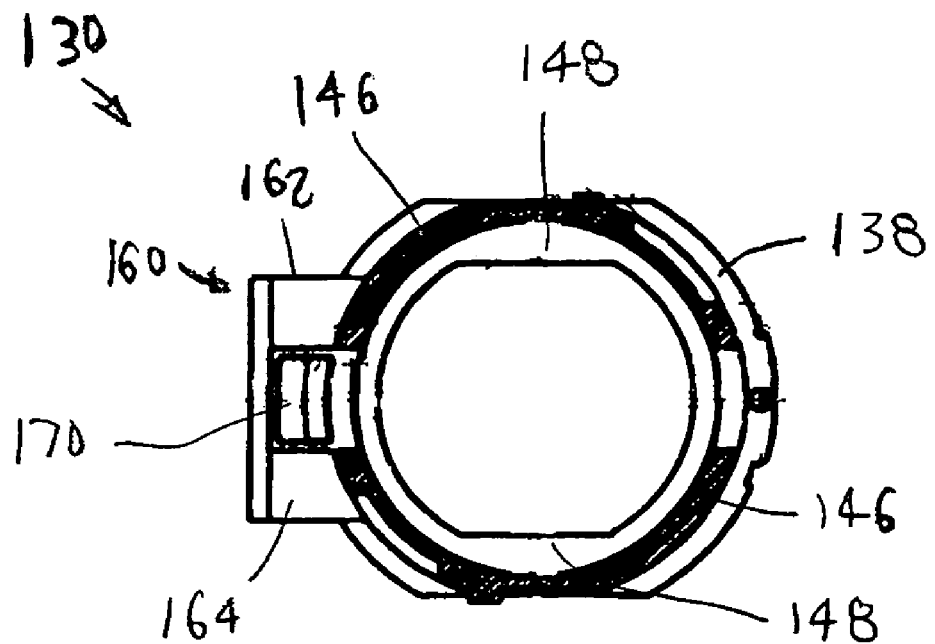
FIG. 16 is a cross-sectional view of the vial holder taken along line 16-16 in FIG. 15.

As shown in FIGS. 12, 13, and 16, the vial holder 130 also includes an adhesive receiving structure 160 that includes a side wall 162 having a frame engaging surface 163 and an upper wall 164. As shown in FIG. 15, the side wall 162 may also include a notch 165 that is configured to engage the inwardly defined rib 34 of the central side wall 32 of the frame 12. The notch 165 further enhances the snug fit between the vial holder 130 and the frame 12. As shown in FIG. 13, a cavity 166 is defined by the upper wall 164, side wall 162, and central side wall 32 of the frame 12 when the frame engaging surface 163 engages the central side wall 32 of the frame 12. The upper wall 164 includes a plurality of ribs 168 that define a roughened surface, thereby provided an increased surface area for the adhesive that is dispensed into the cavity to bond to. The upper wall 164 also includes an opening 170 that is configured to receive an adhesive applicator. As shown in FIG. 13, the upper wall 164 may include a slightly sloped surface 172 to facilitate the insertion of the applicator to ensure that the adhesive is delivered to the cavity 166.

Figure 17:
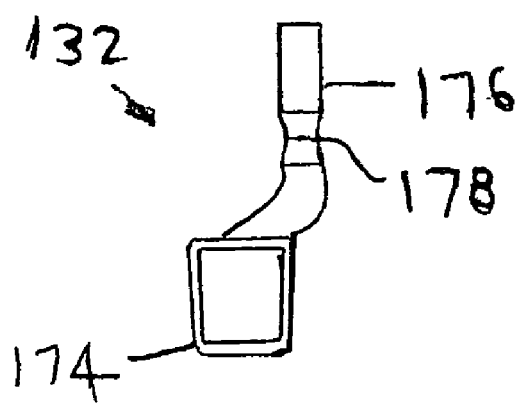
FIG. 17 is a side view of a plug of the vertical indicating level vial holder assembly.

Once the vial holder 130 has been inserted into the frame 12 and properly positioned, a predetermined amount of adhesive that substantially fills the cavity 166 may be dispensed into the cavity by the applicator, and contained within the cavity 166 by the adhesive receiving structure 160. This ensures that no adhesive is wasted. The adhesive may be any suitable adhesive for attaching plastic to metal, such as an epoxy resin. The plug 132, as shown in FIG. 17, is configured to be received by the opening 170 at one end portion 174 thereof, and cover the opening 170 so that the adhesive cannot flow out of the cavity 166. If enough adhesive has been applied, the end portion 174 of the plug 132 also contacts the adhesive such that it becomes firmly bonded to the vial holder 130 once the adhesive cures. A stem 176 extends from the end portion 174 has a reduced thickness at a middle section 178 thereof that is configured to allow the stem 176 to be broken once the plug 132 has been secured to the vial holder 130. The broken off portion of the stem may then be discarded. A small amount of adhesive may also be provided between the vial holder 130 and the frame 12 at a location that is about 180° from the adhesive receiving structure 160, thereby provided a second bond on an opposite side of the vial holder 130.

Figure 18:
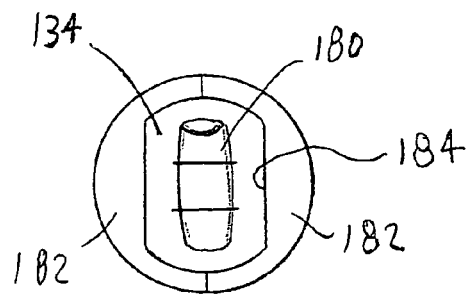
FIG. 18 is a view of a vertical indicating level vial of the vertical indicating level vial holder assembly.

The vertical level indicating vial 134, shown in FIG. 18 may be molded from clear acrylic into a block having a generally tubular or a barrel-like cavity 180 defined therein. A pair of mounts 182 may also be used to substantially surround the edge of the vial 134 and provide an interface between the vial 134 and the vial holder 130. The mounts 182 may be configured to define a window 184 through which the cavity 180 may be viewed. The mounts 182 may be attached to the vial 134 with any type of suitable quick-setting adhesive. Likewise, the mounts 182 may be attached to the vial holder with any type of suitable quick-setting adhesive once the vial 134 has been properly positioned in the vial holder 130 during assembly, as discussed in further detail below. Of course, other types of level indicating vials that are capable of providing accurate vertical level indications may be used. The illustrated embodiment is not intended to be limiting in any way.

Figure 19:
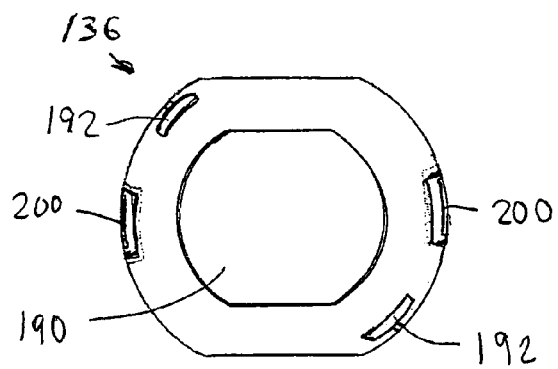
FIG. 19 is bottom view of a flange of the vertical indicating level vial holder assembly.
Figure 20:
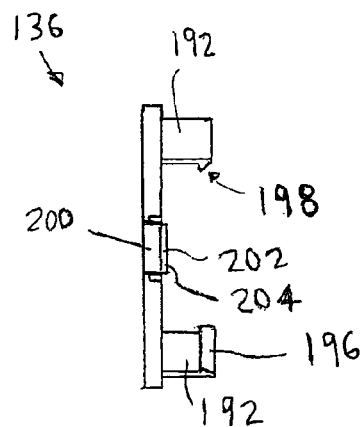
FIG. 20 is a side view of the flange of FIG. 19.

FIGS. 19 and 20 illustrate an embodiment of the flange 136 of the vertical level indicating vial assembly 18. The flange 136 is configured to have substantially the same shape as the flange 138 of the vial holder 130 so that once the level 10 is assembled, the appearance of the installed vertical level indicating vial assembly 18 is the same from opposite sides of the level 10. Just as the opening 48a is larger than the opening 48b, the flange 136 is larger than the flange 138 that engages the opening 48b. The flange 136 defines an opening 190 that is configured to allow the vial 134 to be seen from a wide range of vantage points.

As shown in FIG. 19, the flange 136 also includes a pair of tabs 192 that are configured to engage a pair of corresponding recesses 194 in the wall 136 of the vial holder 130, one of which is shown in FIG. 15. As shown in FIG. 20, each tab 192 includes a hook 196 at a distal end thereof. The hook 196 has a sloped surface 198 that is configured to engage the wall 136 of the vial holder 130 and allow the tab 192 to first flex outward, then "snap" inward once the hook 196 reaches the recess 194, thereby providing a "snap fit" of the flange 136 to the vial holder 130. By providing a pair of tabs 192 on the flange 136 and corresponding pair of recesses 194 on the vial holder 130, the flange 136 may be securely attached to the vial holder 130 without the use of an adhesive or other type of fastener. Of course, if desired, an adhesive may optionally be applied between the flange 136 and the vial holder 130 for further reinforcement.

The flange 136 also includes a pair of tabs 200 that each includes a hook 202 at a distal end thereof. Each hook 202 includes a sloped surface 204, similar to the sloped surface 198 described above, and is configured to engage the central side wall 32 of the frame 12, thereby providing a "snap fit" of the flange 136 to the central side wall 32. Such a snap fit provides an attachment of the flange 136 to the frame 12 without the use of an adhesive or other fastener. Of course, if desired, an adhesive may optionally be applied between the flange 136 and the frame 12 for further reinforcement.

Figure 21:
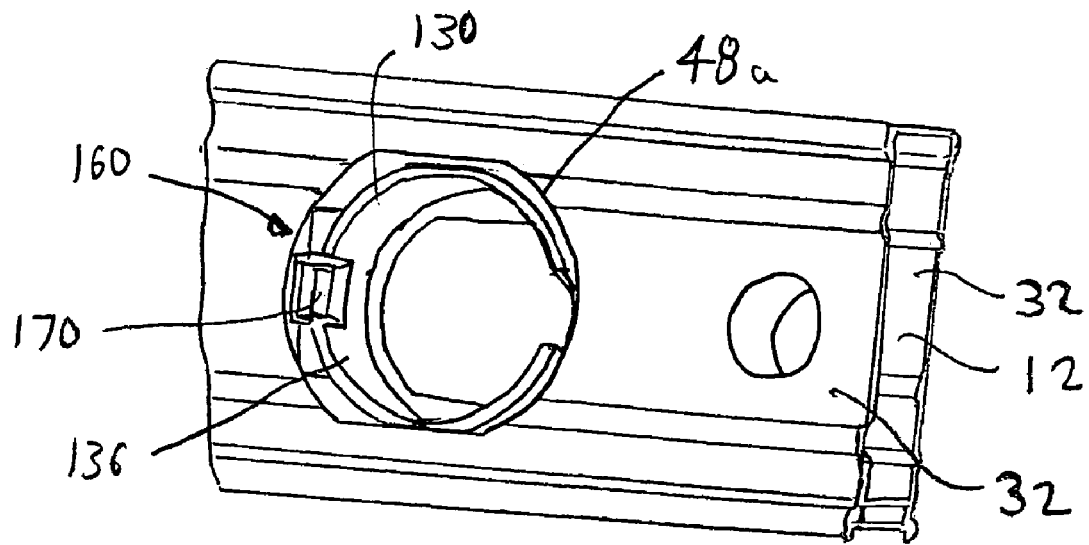
FIG. 21 is a perspective view of one end of the frame of the level with the vial holder of the vertical indicating level vial assembly inserted therein.
Figure 22:
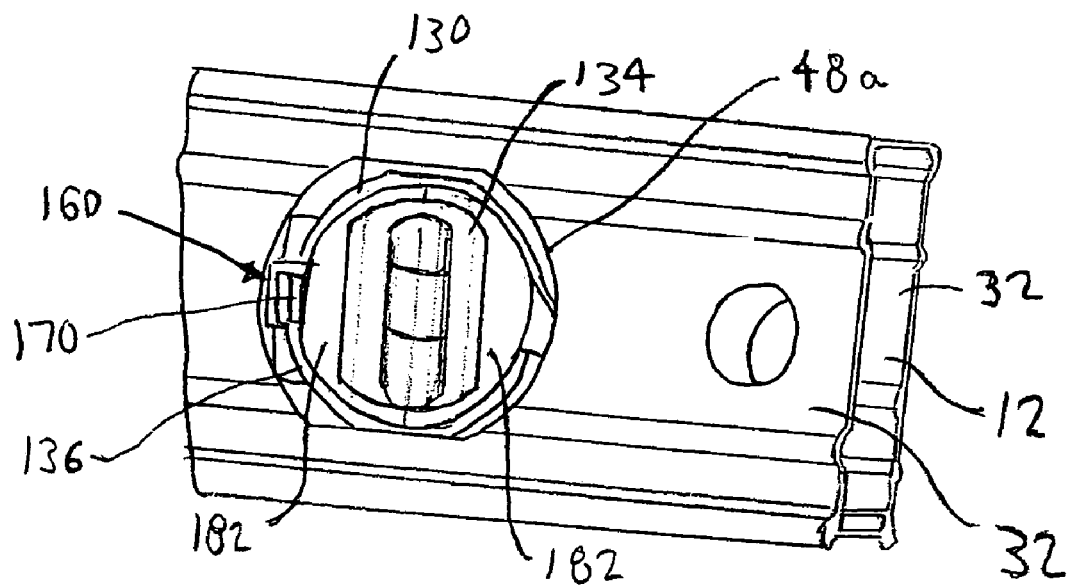
FIG. 22 is a perspective view of the end of the frame of FIG. 21 with the vertical indicating level vial inserted in the vial holder.
Figure 23:
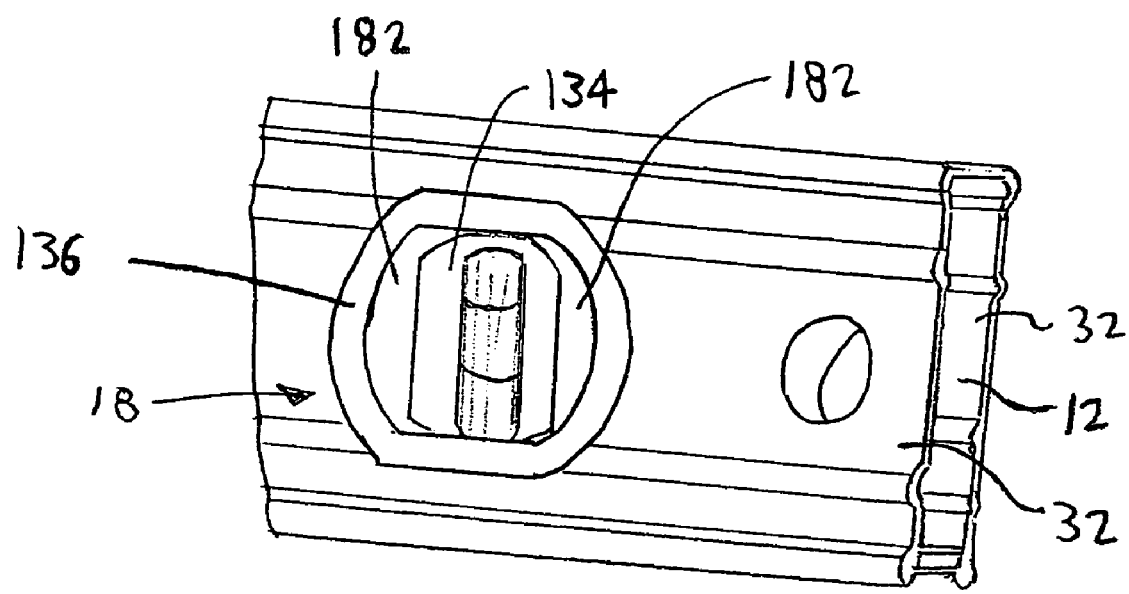
FIG. 23 is a perspective view of the end of the frame of FIG. 21 with the flange connected to the vial holder.

FIGS. 21-23 illustrate the assembly of pieces of the vertical level indicating vial assembly 18 with the frame 12. As shown in FIG. 21, the vial holder 130 is inserted into the frame 12 by being passed through the larger opening 48a in the central side wall 32. Preferably, the adhesive receiving structure 160 is inserted through the larger opening 48a first, then the vial holder 130 is slightly rotated so that the flange 138 clears the opening 48a and the tabs 152 on the vial holder 130 engage the opening 48a. The vial holder 130 may then be rotated so that the flange 138 is aligned with the smaller opening 48b in the opposite central side wall 32, and then pressed into place. The tabs 152 clear the central side wall 32 and the distal ends 156 of the tabs 152 engage the interior surface 38 of the central side wall 32 to essentially "wedge" the vial holder 130 in between the central side walls 32. The vial holder 130 is now properly positioned. The predetermined amount of adhesive may be applied to the cavity 166 with an applicator, and the plug 132 may be inserted into the opening 170 so as to seal the cavity 166 closed. The handle 176 of the plug 132 may then be broken off at the reduced thickness portion 178. An additional application of the adhesive may then be applied to the vial holder 130 at an additional point that is 180° from the cavity 166 for additional reinforcement, if desired.

As shown in FIG. 22, the vertical level indicating vial 134, having already been attached to the mounts 182, may then be inserted through the opening 48a and into the vial holder 130. After the vertical level indicating vial 134 has been received by the vial holder 130, the vertical level indicating vial 134 may be accurately positioned relative to the reference surface so that vertical level indicating vial 134 provides an accurate indication of the orientation of the level 10. Once the vertical level indicating vial 134 is in the correct position, an adhesive may be applied between the mounts 182 and the wall 136 of the vial holder 130 to thereby fix the position of the vertical level indicating vial 134. As shown in FIG. 23, the flange 136 may then be inserted into the opening 48a and snap fit to the vial holder 130 via the tabs 192, and also snap fit to the frame 12 via the tabs 200. The vertical level indicating vial assembly 18 is now securely attached to the frame 12, with the vertical level indicating vial 134 accurately positioned.

The illustrated embodiment provides for an improved method of assembly, as all of the parts of the vertical level indicating vial assembly 18 are inserted through the same side of the frame 12. In addition, by providing a cavity 166 in which to deposit the adhesive, a predefined, consistent amount of adhesive may be used, thereby ensuring that there is enough adhesive present to ensure a proper bond between the vertical level indicating vial assembly 18 and the frame 12, and also ensuring that no adhesive is being wasted, which may reduce the cost to manufacture the level 10.

Figure 24:
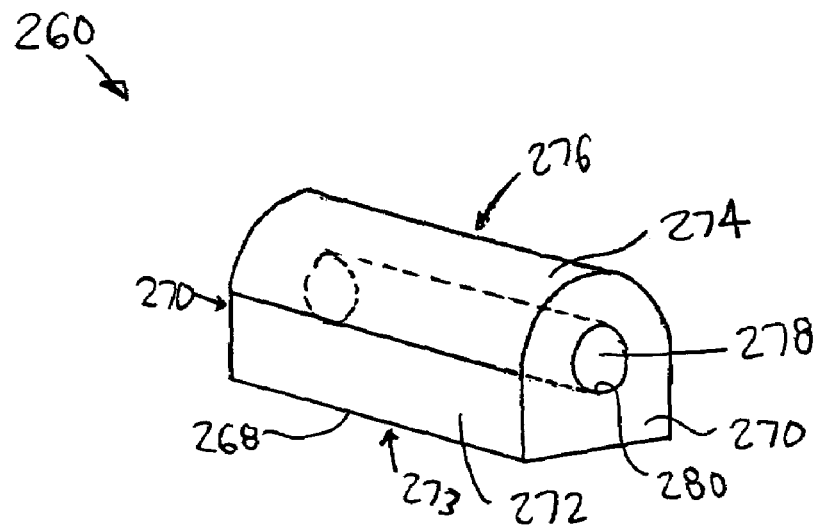
FIG. 24 is a perspective view of an embodiment of a blank for a horizontal indicating level vial after it has been injection molded.

FIGS. 24-28 provide a more detailed illustration of how an embodiment of the horizontal level indicating vial 60, discussed above, is fabricated. As shown in FIG. 24, a vial blank 260 is first molded in an injection molding machine. Preferably, the vial blank 260 is molded from a clear plastic, such as acrylic. The vial blank 260 includes an elongated substantially horizontal planar, rectangular shaped bottom surface 268, and a pair of substantially parallel vertical end surfaces 270 that extend upwardly from the shorter sides of surface 268 in a manner substantially perpendicular to surface 268 and substantially parallel to one another. The vertical end surfaces 270 define the ends of the blank 260.

Another pair of substantially parallel vertical surfaces 272 also extend upwardly from the longer sides of rectangular surface 268 and are parallel to one another, and extend perpendicularly upwardly from bottom surface 268. The vertical surfaces 270 and the vertical surfaces 272 are substantially perpendicular to each other so as to create a rectangular box shaped base 273 portion of the blank (and of the resulting vial). A curved surface 274 extends between the two vertical surfaces 272, as well as the vertical surfaces 270, and defines an upper portion 276 of the blank 260. The curved surface 274 provides the blank 260 with a surface that magnifies the bubble inside. In one embodiment, the curved surface 274 extends about 180° relative to the longitudinal axis of the blank 260, thereby defining a half-cylinder, as shown in FIG. 24. Thus, the upper portion 276 of the blank (and the resulting vial) forms a generally cylindrical upper portion that transitions into the generally rectangular box shaped lower portion 273. The curved surface 274 allows for the magnification of the bubble from a viewing angle having a range of at least 180° relative to the longitudinal axis of the vial. It should be appreciated that upper curved surface configurations other than cylindrical can be used. That is, in one embodiment, a user of the level would be able to see a magnified bubble, and the internal cavity, from one side of the level continuously for 180° to the opposite side of the level. Also, by extending the curved surface 284 to each of the end vertical surfaces 270 of the vial, a view of the bubble is not obstructed when the user looks along the longitudinal axis of the vial and the level. By providing a wider viewing range in both directions (e.g., along the longitudinal axis of the level and transverse to the longitudinal axis), the level may be used in applications that are more difficult to reach.

The vial blank 260 also includes a substantially cylindrical cavity 278 that is created with a core pin as the blank 260 is being molded in the molding machine. The use of core pins in molding machines to create vials is generally described in U.S. Pat. No. 6,840,756, which is incorporated herein by reference.

Figure 25:
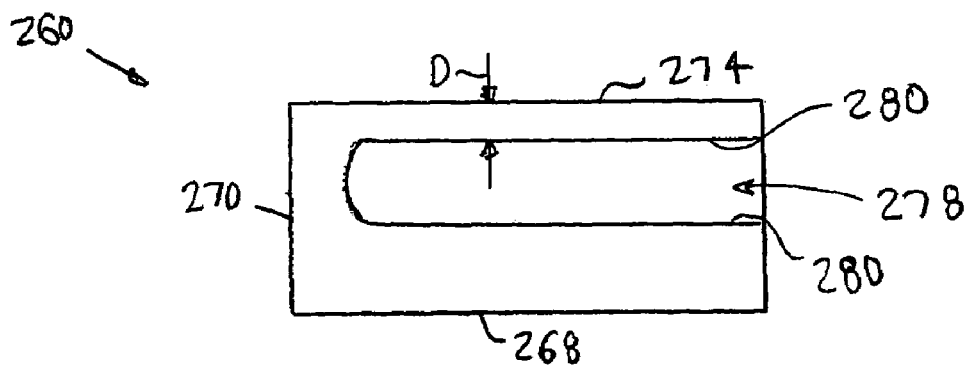
FIG. 25 is a side view of the vial of FIG. 24.

In one embodiment, the molded or extruded cylindrical cavity 278 is perfectly cylindrical so that the distance D between a surface 280 of the cylindrical cavity 278 and the outer cylindrical surface 274 of the blank is substantially constant, as shown in FIG. 25. It has been found that by creating the vial blank 260 with a constant thickness in the upper portion 274 thereof, the walls that are defined by the cylindrical surface 274 and the cylindrical cavity 278 are allowed to cool at substantially the same rate, and shrink by the same amount, thereby providing a vial blank with improved dimensional stability. In contrast, if the cavity was designed so that the walls in the upper portion were not of a constant thickness, the thicker walls would cool slower than thinner walls, which would create stresses in the upper portion, and possible allow the upper portion to deform. Even a small amount of deformation may have a negative impact on the accuracy of the vial.

It should be appreciated that, in another embodiment, the upper surface 274 can have a curved surface, but not exactly cylindrical, and the inner molded cavity 278 would have a generally corresponding configured upper surface, thus keeping the upper wall thickness of the vial constant during the cooling process, as described above.

Figure 26:
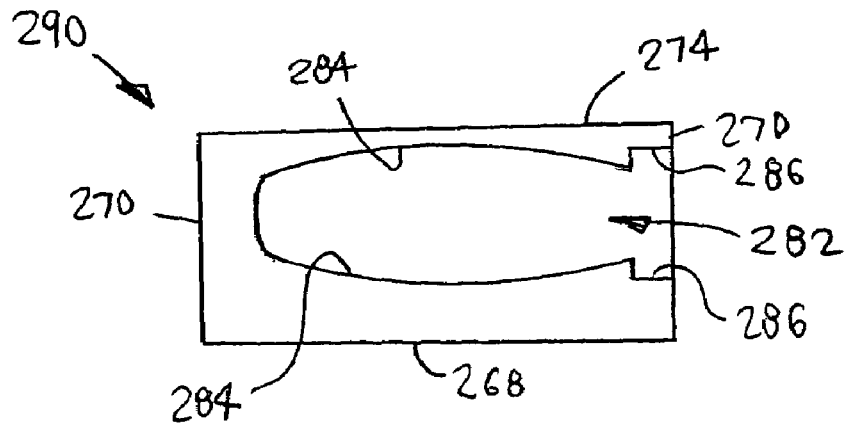
FIG. 26 is a side view of the vial of FIG. 25 after an internal surface thereof has been machined.

After the vial blank 260 has cooled to a temperature below the glass transition point of the material, the vial blank 260 may be machined with a cutter so that a barrel-shaped cavity 282 is formed, thereby defining a body 290 of the vial 60. Any suitable type of cutter may be used cut the material so that a surface 284 that is curved relative to the longitudinal axis is formed, as shown in FIG. 26. By starting with a consistent wall thickness, a consistent cutting location reference for the cutter is provided, and the cutter may be located relative to the curved surface 274. This allows for a more precise cut so that the surface 284 is properly defined. In addition, a cutter may be used to create another surface 286 at one of the ends 270 of the body 290.

Figure 27:
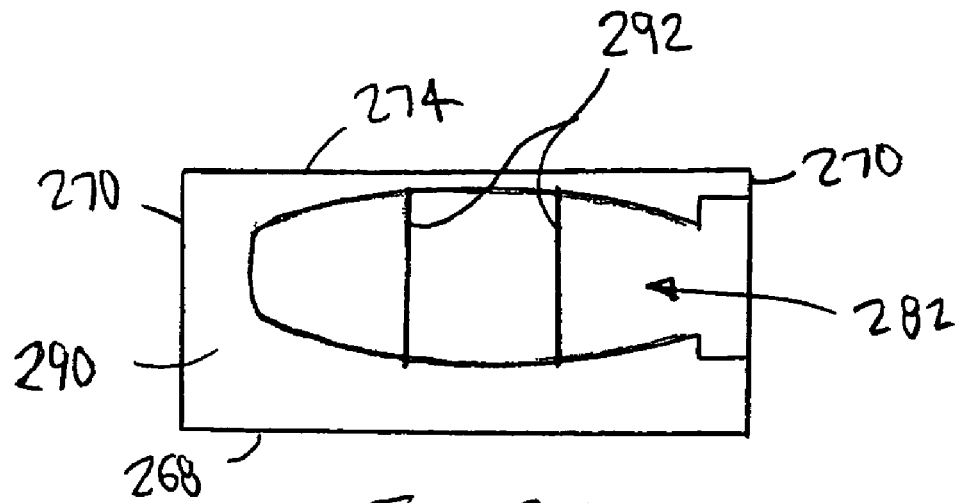
FIG. 27 is a side view of the machined vial after marks have been scored therein.
Figure 28:
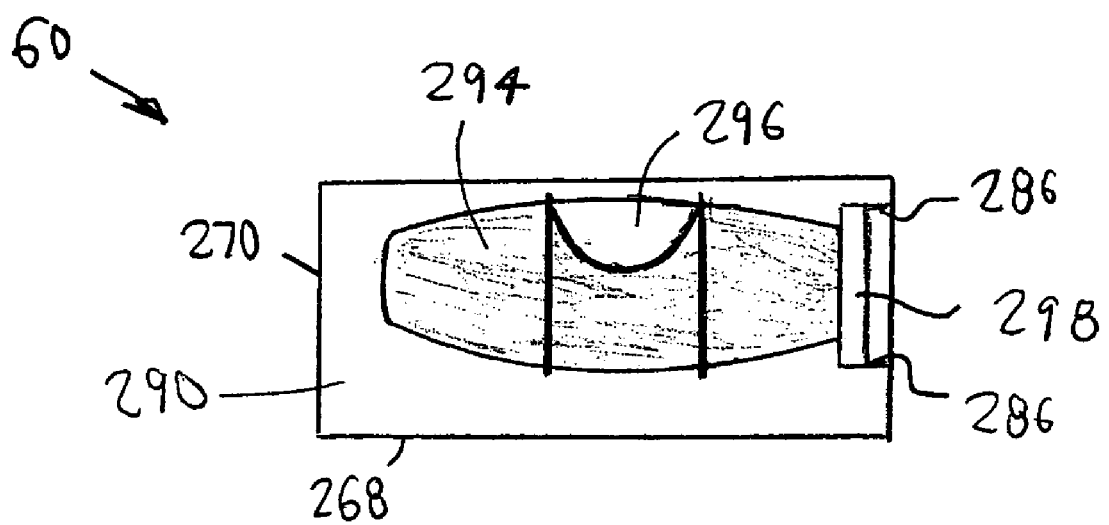
FIG. 28 is a side view of a finished vial after the vial has been filled with a liquid and sealed.

As shown in FIG. 27, a pair of scribe marks 292 may be created in the barrel-shaped cavity 282 with the cutter, and a colored material or even pieces of metal may inserted into the scribe marks 292 to create indicators that are typically used in level vials. The barrel-shaped cavity 282 may then be filled with a liquid 294 to a level that creates a bubble 296 within the cavity 282 once the cavity 282 has been sealed with a cap 298. The cap 298 may be attached to the body 290 via the surface 286 with any suitable adhesive.

This method of manufacturing the vial 60 provides a vial with the advantages of curved vials that magnify the bubble, along with the accuracy that is found in vials having a constant wall thickness. In addition, by using the vial mount 62 and vial holder 64, described above, to mount the vial 60 to the frame 12 of the level 10, the vial 60 may have its curved surface 274 (i.e., curved along the upper surface as the upper surface extends laterally, from one side of the longitudinal axis to the other) extend end 270 to end 270, which allows the barrel shaped cavity 282 to be viewed from a greater range of angles. In one embodiment, both the barrel shaped cavity and bubble contained therein can be seen continuously, without any intervening joint lines or changes in wall thickness for at least 120° in one embodiment, and at least 180° in another embodiment, when viewing the cavity 282 and bubble circumferentially from different positions relative to the barrel. While the wall thickness will be different at different longitudinal positions of the barrel shaped cavity 282 as a result of the cutting or drilling of the cavity to form the barrel shape, the wall thickness at only one longitudinal position of the barrel shaped cavity will be generally constant for at least 120°, and in another embodiment for at least 180° circumferentially.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A vial for a level comprising:
  a body being defined by a generally cylindrically shaped upper exterior surface portion extending continuously from a first end surface to a second end surface, and a generally rectangular, block shaped lower exterior surface portion, the first end surface and the second end surface being substantially parallel to each other and extending perpendicularly upwardly from a bottom surface of the lower exterior surface portion;
a sealed barrel-shaped cavity within the body; and
a liquid contained within the cavity, the liquid being at an amount that creates a bubble within the cavity.

2. A vial according to claim 1, wherein the generally cylindrically shaped upper exterior surface portion defines a half-cylinder.

3. A vial according to claim 1, wherein the body is molded from a clear plastic.

4. A vial according to claim 3, wherein the clear plastic is acrylic.

5. A vial for a level, comprising:
a body having a first longitudinal end and a second longitudinal end, said body having a generally rectangular block shaped lower exterior surface, having an upper surface that is curved as the surface extends laterally from one side of vial to the opposite side of the vial, said curved upper surface being formed along an entire length of said vial body;
a sealed barrel-shaped cavity within the body; and
a liquid contained within the cavity, the liquid being in an amount that creates a bubble in the cavity, the bubble being magnified by the curved upper surface.

6. A vial according to claim 1, wherein the generally cylindrically shaped upper exterior surface is defined by a constant diameter from the first end surface to the second end surface.

7. A vial according to claim 5, wherein the curved upper surface is defined by a constant diameter along the entire length of said vial body.

* * * * *